United States Patent [19]

Hawes

[11] 3,897,154
[45] July 29, 1975

[54] SAMPLE-BACKGROUND AUTOCANCELLATION IN FLUID-SAMPLE ANALYZERS

[76] Inventor: Roland C. Hawes, 771 Oakglade Dr., Monrovia, Calif. 91016

[22] Filed: Nov. 15, 1973

[21] Appl. No.: 416,233

[52] U.S. Cl. .................... 356/51; 73/23.1; 250/345; 250/575; 356/88; 356/106 IS; 356/181; 356/205
[51] Int. Cl. .......................... G01n 21/34; G01j 3/42
[58] Field of Search ............ 356/51, 88, 89, 93, 94, 356/95, 106 IS, 181, 205, 206; 250/345, 575; 73/23.1

[56] References Cited
UNITED STATES PATENTS

| | | | |
|---|---|---|---|
| 3,286,582 | 11/1966 | Mertz | 356/106 IS |
| 3,345,859 | 10/1967 | Fenske | 73/23.1 |
| 3,437,411 | 4/1969 | Rudomanski et al. | 356/95 |
| 3,637,310 | 1/1972 | Naono | 356/88 |

*Primary Examiner*—Vincent P. McGraw

[57] ABSTRACT

Apparatus and process provide qualitative and quantitative analysis of sample constituent(s) in a fluid, relatively free from qualitative ambiguities and quantitative zero displacements due to slowly changing contamination in the measurement stream. Slowly changing zero displacement in the stream is cancelled out by the taking of continuous measurements at two points along the stream and continuously manipulating the two measurements as by subtraction.

17 Claims, 11 Drawing Figures

3,897,154

SAMPLE-BACKGROUND AUTOCANCELLATION IN FLUID-SAMPLE ANALYZERS

BACKGROUND OF THE INVENTION

This invention relates to the problem of determining unknown constituents and/or measuring constituent concentrations in a fluid, under circumstances such that a "contaminant" or extraneous constituent of the fluid interferes with monitoring of the constituent sought. If the contaminant concentration fluctuates, accurate subtraction of the "background" due to the contaminant is difficult. Resort to dual-channel monitoring systems (that is, addition of a "reference" monitor) fails to solve the problem — at least in the absence of a second fluid stream containing only the contaminant at concentrations which accurately track the contaminant concentrations in the sample fluid.

A case in point is the analysis of a gas sample by gas chromatography. Such measurements can be particularly valuable when using an infrared spectrometer as a detector, because qualitative as well as quantitative analysis is possible. In such instrumentation, one of the significant limitations upon measurement accuracy is error due to contamination of the sample by gaseous material which "bleeds" from the coating on the adsorbing surface in the chromatographic column. Such "bleeding" of the column coating material is especially troublesome in "temperature-programmed" gas chromatography, wherein the rising column temperature tends to volatilize or decompose the adsorbing material, yielding constituents in the effluent which are unrelated to the test sample being analyzed. In such a case it is not obvious how to obtain a signal related purely to the "bled" coating material; consequently it has in prior devices not been possible to obtain satisfactory correction for or cancellation of the "bled" coating.

Some workers have attempted to solve this problem by providing a second chromatographic column, not injected with the sample gas, to provide suitable background gas for the reference cell of the spectrometer. This technique requires that the two columns be closely matched as to the coated adsorbing layer, on either the column wall or its packing, and as to carrier-gas flow rate as well as temperature, throughout their respective lengths. An accurate balance is not easily maintained.

Similar difficulties can arise in the case of a chromatograph operated with a carrier gas which has a constituent (such as, for example, either a contaminant, or the carrier gas itself) which interferes with measurement of the sample gas.

Analogous unsatisfactory background-matching attempts are familiar in other fluid-stream-measurement situations.

In measurements employing spectrally-distinguished characteristics, regardless of whether chromatographs are used, it is possible for the spectral effect of an extraneous constituent of even very weak concentration to interfere with interpretation of the spectrum of a desired constituent — because the extraneous constituent may have relatively intense spectral features.

My invention resolves all these difficulties for situations in which the contaminant concentration in a fluid stream changes slowly compared with the sample-constituent concentration(s) of interest.

GENERAL CONCEPT OF THE INVENTION

My invention solves the problem described above, by directing the fluid stream through both measuring stations of a dual-channel monitoring system. It is advantageous, though not strictly necessary as will be seen herebelow, that the stream pass through both stations in series, placing the slowly-changing contaminant material in both stations at once, at very nearly the same concentrations, so as to permit an accurate balancing-out of the interference due to the contaminant. Sample constituent concentrations in the stream change more rapidly, so each sample constituent can be substantially all in one station at a time — first substantially all in a particular one of the two stations, then substantially all in the other station.

Thus in gas chromatography using a dual-beam infrared spectrometer (particularly a dual-input interferometric spectrometer) as detector, the effluent gas from the chromatographic column passes through both the spectrometer "sample" and "reference" cells — advantageously, but not necessarily, in series. The spectrometer measurement light beams thus respectively pass through very nearly equal concentrations of "bleed" from the chromatographic column (or interfering carrier-gas constituent, as the case may be). In some such systems, as will be seen, the conventional distinction between "sample" and "reference" paths disappears; while in other such systems this distinction is maintained.

In a first form of the invention, which may be called the "flow-delay" form, the flow path is such as to effect a time delay between arrival of each sample constituent at the two stations respectively — a delay which is substantial compared with the effective residence time of the stream in (at least) the station at which the sample arrives first. The two signals from the respective measurement stations may, in general, be compared with each other and interpreted in various ways including but not limited to subtraction of one signal from the other.

Other mathematical functions of the two signals may provide contaminant-effect autocancellation, and may very well be equally or even more advantageous, and are within the scope of my invention; but I have preferred to explore the subtractive function.

In the subtractive approach, the output signal undergoes an excursion first in one direction and then in the other — the two measurement stations alternately assuming the roles of "sample" and "reference" as the sample constituent arrives in first one station and then the other. This bidirectional signal pattern may be simply displayed for human interpretation on an analog or digital meter or (preferably) recorder: a skilled person can associate each such signal pattern with a sample constituent passing through the system at a particular time, and thereby determine the concentration of that constituent at that time.

However, I consider it preferable first to apply some additional data processing, because (1) the bidirectional signal patterns are an unconventional representation, an artifact of the measurement process; as such they require an additional level of understanding on the part of the human interpreter; and (2) the system response in one direction due to passage of one constituent of the sample through one measurement station may happen to occur at substantially the same time as a response in the opposite direction due to passage of a different constituent of the sample through the other measurement station — thereby distorting the bidirectional signal patterns for both constituents. This second reason can be particularly important if both excursions of a particular constituent's bidirectional signal pattern happen to be subject to such distortion, leaving no simply interpretable signal level as representative of the concentration of that constituent (though in fact a sophisticated interpretation scheme can disclose the information present with as much certainty as in more-usual representations).

A particularly effective kind of data processing, applicable to the simple-subtraction comparison method mentioned already, is integration of the bidirectional signal. This, as will be shown, minimizes the effects of interconstituent signal cancellation, and permits a unidirectional signal pattern. If suitable delay between sample arrival at the two measurement stations can be provided, the integration technique also makes the signal-excursion "shape" very simple, and thus amenable to ready interpretation by semiskilled personnel.

In a second form of the invention, which may be called the "dilution" form, the sample stream before passage into one of the two measurement station(s) passes first into a relatively large dilution chamber. This chamber may entirely precede the station concerned, along the flow path (so that in series-flow systems it is entirely along the flow path between the two measurement stations), or it may include the station itself (in series-flow systems, the second measurement station along the flow stream). In either case, if the dilution chamber is sufficiently large relative to the volume of each sample constituent, the sample-constituent concentration in the measurement station which is associated with the dilution chamber may be neglected.

The dilution form of the invention is amenable to simpler interpretive procedures, since the measurement station which contains the diluted sample constituents serves straight-forwardly as a "reference" channel; however, the dilution form of the invention is limited to instances in which the contaminant concentrations change quite slowly relative to the effective residence time in the dilution chamber. In such instances the dilution form of the invention is preferred for its resultant interpretive simplicity. In many situations, however, the requirement that contaminant concentrations change slowly is unacceptable; for example, in many programmed-temperature gas chromatographs, the "bleed" concentration can change significantly in much less than a minute. In such instances the flow-delay form of the invention is preferred for its relatively rapid accommodation to changing contaminant levels.

In practice the two effects which produce these two forms of the invention are almost never completely separable: there is always some mixing or dilution of sample constituents (and resultant broadening of constituent "peaks") even in passage of the sample fluid through the measurement stations; and there is almost always some effective delay in passage of the greatest concentration of a given constituent from the center of one measurement station to the center of the other, even if the flow path between stations is a short conduit. (The single exception is in the case of a parallel-flow arrangement of the dilution form of my invention.)

The various details and advantages of my invention may be more fully understood by reference to the accompanying drawings, of which:

DETAILED DISCUSSION

Figure 1:
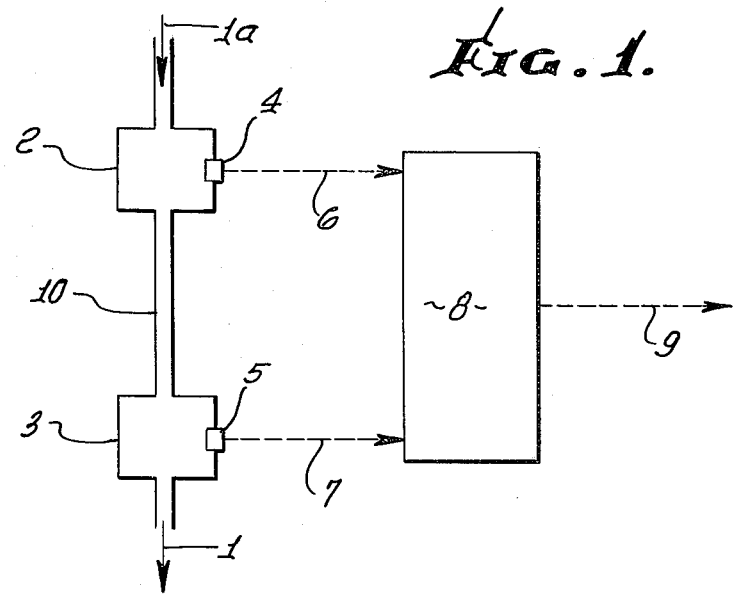
FIG. 1 is a schematic representation of the preferred flow pattern for my invention — the "series" flow pattern.

FIG. 1 illustrates the general concept of my invention in its "series" form. In this figure, 1a is a fluid stream entering a monitoring system, and 1 is the same fluid stream leaving the monitoring system. Within the monitoring system the fluid stream traverses monitoring stations 2 and 3 which are connected in series (with respect to the fluid-stream flow path) by intermediate flow means 10. Associated with monitoring stations 2 and 3 respectively are sensing means 4 and 5 which impart to the monitoring stations the capability of deriving respective signals 6 and 7 in response to the presence of one or more sample constituents in the fluid stream. These signals are directed to processor 8 which in effect derives a difference (or other mathematical combination) signal — and which may also integrate or otherwise process the difference (or other) signal for display, storage, or other functional connection as an output signal 9.

In process-control systems or the like, the output signal 9 may be utilized to operate a control component such as a switch, valve, or more complex control element, to effect functional control of a production process, or a safety system, or other apparatus. All such devices — whether display, storage, control, and/or other signal-utilizing devices — for using the output signal 9 are referred to herein as "utilization means", while for simplicity only one type of utilization means is illustrated.

Because slowly-changing contaminant materials are present in substantially equal concentrations in stations 2 and 3, their effects substantially cancel out in the output signal 9 for subtractive processors 8. In this disclosure only subtractive processing, and subsequent integration of the resulting difference signal, will be discussed in detail — though my invention is not limited thereto, and other mathematical functions may be used without necessarily departing from the scope of the invention.

Figure 2:
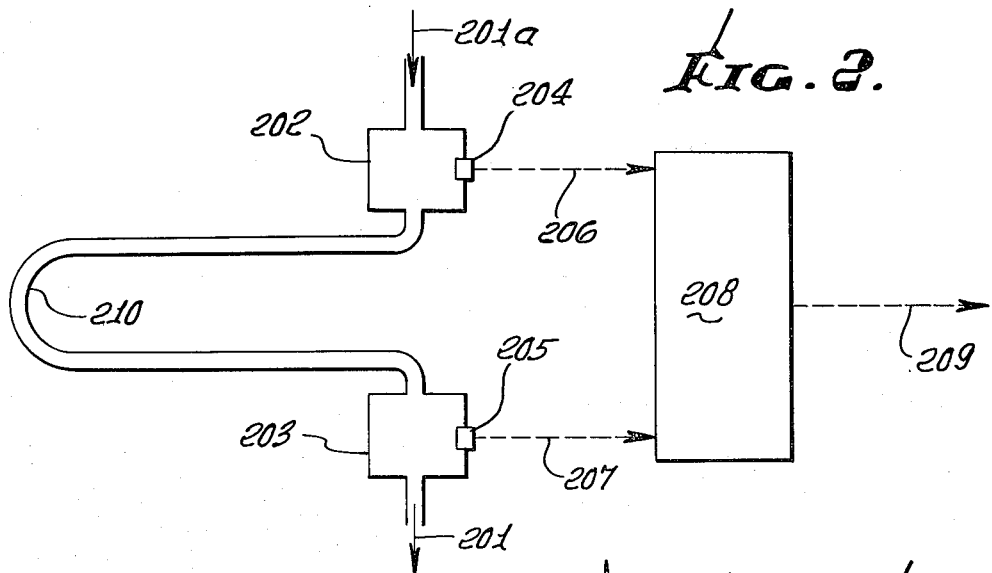
FIG. 2 is a schematic representation emphasizing the flow pattern of the series "flow-delay" form of my invention.

In FIG. 2, fluid enters and leaves the measurement system at 201a and 201, respectively, traversing in series as before measurement stations 202 and 203 which have respective sensing means 204 and 205. These sensing means in cooperation with the measurement stations derive signals 206 and 207, which are processed at 208 to produce an output signal directed at 209 to utilization means. Here however the flow means 210 between stations 202 and 203 are shown schematically as being rather long — that is, the volume of the flow means 210 is substantial relative to the volume of station 202, but the flow means retain substantially the character of a conduit or tubulation, rather than a chamber, in that their length along the flow path is many times their transverse dimension. Thus this illustration shows in an emphasized and even exaggerated representation the "flow-delay" form of my invention. It will be clear that if the quantity and concentration of a particular sample constituent are such that nearly all of the constituent may be within measurement station 202 at one time, then at that time the quantity of that same constituent in station 203 will typically be negligible, in view of the flow delay at 210. As will be seen later, it is not necessary to provide such an exaggerated interstation-flow-means length to practice successfully the flow-delay form of my invention.

Figure 6:
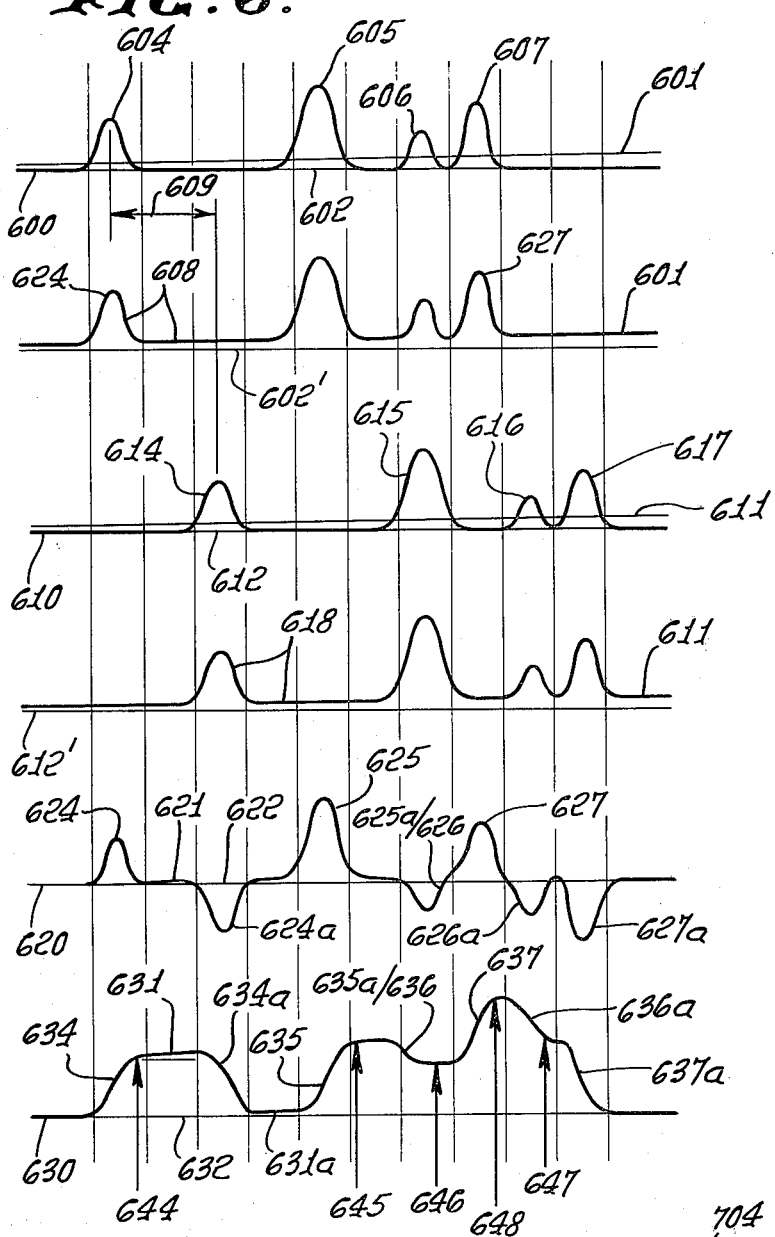
FIG. 6 is a signal diagram showing some time and signal-amplitude relationships involved in the "flow-delay" form of my invention — either series or parallel flow pattern.
Figure 6A:
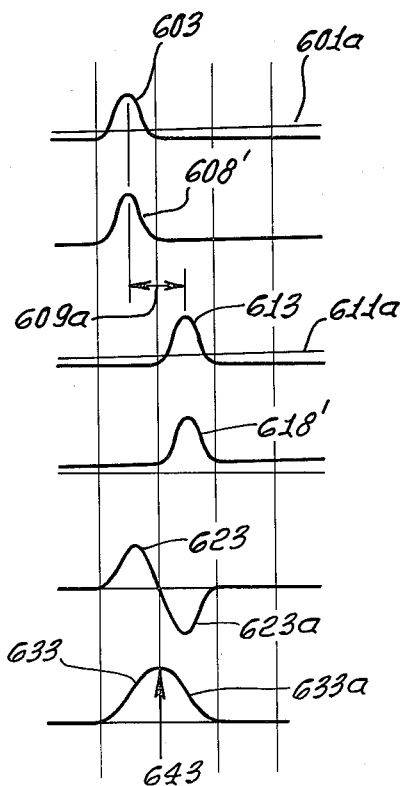
FIG. 6a is a special case of FIG. 6.

FIGS. 6 and 6a represent details of sample and contaminant concentrations in the two measurement stations 202 and 203 of FIG. 2, the resulting electrical signals at 206 and 207, and some possible versions of output signal 209 — all vs. time. (FIG. 6 also is applicable to concentrations and signals in the parallel flow-delay arrangement of FIG. 2a, to be discussed later.) In the top drawing of FIG. 6, the trace 600 represents actual concentrations of various sample constituents in measurement station 202, as such concentrations sequentially appear in that measurement station; the trace 601 represents concentration of contaminant material in the same station during the sequential appearance of sample-constituent concentrations; and the line 602 represents the zero-concentration level. Thus peaks 604, 605, 606 and 607 represent respectively the successive appearances of various sample constituents in the station. The contaminant concentration level 601 is significant relative to the sample concentrations; and changes significantly in a way which is not obviously correlated with the sample concentrations; however, the contaminant concentration changes substantially less rapidly than the sample concentrations change.

In the second drawing of FIG. 6, the trace 608 (relative to zero line 602') represents the "sum" signal 206 (of FIG. 2) which results from response of sensor 204 to concentrations 600 and 601 simultaneously. (For simplicity of discussion the signals are shown here as positive for higher concentrations, from a baseline level of zero; though in practice, depending on the type of detector used, the zero-concentration signal level may be nonzero and the presence of nonzero concentrations may reduce the signal level. The signal illustrated can be obtained from such actual detector-output signals by one inverting amplifier and dc offset.) It is this signal which is directly accessible to the analyst in prior-art systems; and the object of my invention is to eliminate the variable and unknown contaminant-generated component, giving access to information more directly related to unknown sample-constituent concentrations 600.

In the third drawing of FIG. 6, the traces 610, 611 and 612 represent the same actual concentration and zero levels as 600, 601 and 602, respectively, as they later appear in the second measurement station 203. The traces 610 and 611 are nearly identical with 600 and 601, except that 610 and 611 are displaced to the right from 600 and 601, respectively, by a distance 609 on the drawing. This distance corresponds to the time required for the fluid stream to proceed from the center of station 202 via extended flow means 210 to the center of station 203. In practice some bidirectional diffusion, and possibly turbulence, of the sample in the stream occurs during this time; this "mixing" results in slight broadening and slight height decrease of the peaks as observed at station 203. However these effects can be made negligible in most applications.

In the fourth drawing of FIG. 6, the trace 618 (relative to zero line 612') represents the "sum" signal 207 which results from response of sensor 205 to concentrations 610 and 611 simultaneously. This trace is of course nearly identical with trace 608 except for displacement to the right by the distance 609, whose significance has already been stated. (The trace shapes are also very slightly different due to "mixing" in the measurement chambers 202 and 203 and flow path 210, as mentioned above.)

In the fifth drawing of FIG. 6, trace 620 shows the result of subtracting trace 610 from trace 600, within the signal processor 208. Positive peak 624 in effect results from peak 604, negative peak 624a from the subtraction of peak 614. Nonzero intermediate segment 621 is a result of subtracting contaminant level 611 from 601, at a time when the contaminant concentration in station 203 has not quite "caught up" with that in station 205. Of course this slight residual error — much smaller than the overall contaminant concentration — is also present at the peaks 624 and 624a. Clearly in this resultant signal the effects of contaminant concentrations are nearly absent — the only imperfections arising where significant changes in contaminant concentration occur during time intervals shorter than the interval corresponding to the distance 609. This illustrates the desirability of using the shortest flow delay which can effectively provide "time separation" of each sample constituent's respective appearances in the two measurement stations.

The bidirectional signal pattern 620, as previously mentioned, may be bewildering to an observer who is not acquainted with the foregoing explanation. Moreover, if a concentration peak such as 606 in station 202 should happen to occur at about the same time as a concentration peak such as 615 in station 203 — that is to say, if two constituents of the sample happen to be separated in the fluid stream by a time interval roughly equal to the flow delay established at 210 — then the resultant trace 620 may not be easy to interpret in the overlap area, as at the peak marked 625a/626.

For these reasons I prefer to include in signal processor 208 an integrator, to derive from difference signals such as 620 an integrated signal such as 630, in the bottom drawing of FIG. 6. Rising segments such as 634 of trace 630 result from positive peaks 624 of trace 620, while falling segments such as 634a result from negative peaks 624a. Very slowly rising segments 631 and 631a result from very small residual offsets 621 and 621a, again pointing to the desirability of minimizing delay interval 609 to the extent practical. However, it must again be emphasized that these residuals are typically very small; in the drawings they have been exaggerated to permit clear illustration.

The heights of the nearly horizontal portions of trace 630 are related to the sample constituent concentrations sought. Although some additional signal processing of these signals may be required to derive signals which are proportional to sample concentration, depending upon the type of sensor used, in this discussion for simplicity it will be said that these signals "represent" the sample constituent concentrations sought. For example the nearly flat peak 631 — or particularly its height at 644 — represents the sample concentration corresponding to peak 604; the flat-topped peak 645 represents the sample concentration corresponding to peak 605. It is of interest to note the integrating system behavior in instances where overlap occurs, as at 625a/626 mentioned earlier: here there are a distinct flat (elevated) trough 646, representing the sample concentration corresponding to peak 607. Intermediate flat-topped peak 648 represents the sum of the two concentrations represented respectively by 646 and 647.

If the heights of the trace 630, relative to zero-line 632, represent sample concentrations, the the areas under curve 630 represent sample amounts — given constant flow rate and pressure.

The traces in FIG. 6a are a special case of traces such as those in FIG. 6. In FIG. 6a it is assumed that delay interval 609a is chosen to be roughly equal to, or slightly greater than, the half-height width of a typical sample peak, such as 603 — shown added to background 601a as 608'. Upon subtraction of similar but delayed peak 618' in signal 207 from peak 608' in signal 206, the resultant is bidirectional curve 623/623a, which has the general shape of the derivative of a Gaussian peak. Integration therefore produces curve 643 of very generally Gaussian shape, whose peak occurs halfway between the original peaks 603 and 613. The contaminant level is effectively suppressed as before (curve 630), but the flat-topped peak shape previously discussed is here replaced by a waveform which is more traditional in general appearance.

If the delay is shortened appreciably relative to that of FIG. 6a, the heights of peaks 603, 613, 608, 618, 623, 623a and 643 are reduced, producing a spuriously low measurement. Shortening the delay can also degrade accuracy because some constituents may exhibit more "tailing" than others: if the apparent concentration or amount as indicated by the integrated peak height is very sensitive to the exact shape of a peak, then the proper compensation for tailing may be difficult to determine for samples having variegated constituents. However, the short delay time has the advantages of (1) reducing the aforementioned "mixing," and (2) accurate autocancellation of relatively rapidly changing contaminant levels. If the delay is lengthened appreciably, the shapes of FIG. 6 result. I personally prefer to arrange the system flow rate and the length of delay line 210 to obtain curve shapes such as those of FIG. 6a, though some adjustments are required to maintain this condition for various kinds of sample constituents — whose peak widths are correspondingly various.

Figure 3:
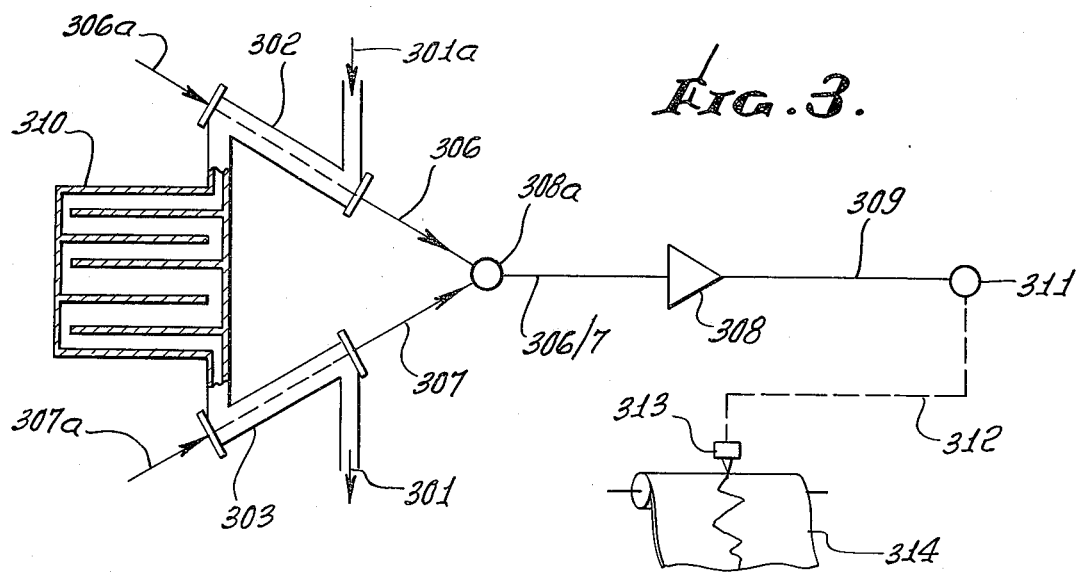
FIG. 3 is an example of the principle of FIG. 2 using absorption spectrometry as detection medium.

FIG. 3 represents in more specific terms the exaggerated-"flow-delay" series form of my invention. Here the measurement stations are flow-through optical cells 302 and 303, provided with optical-quality end windows for entrance of infrared (or other radiation) measurement beams 306a and 307a, and exit of such beams (after attenuation by any sample or contaminant present) at 306 and 307. The fluid stream for analysis enters cell 302 at 301a and leaves cell 303 at 301, passing between the cells through flow means 310, which as 210 in FIG. 2 represents a long flow path.

In FIG. 3 it is tacitly assumed that 306a and 307a are beams of restricted wavelength, coming from a common monochromator, interferometer, filter, or line-radiation source, and that 308a is a detector (producing an electrical signal 306/7 in response to radiation signals 306, 307); however, with appropriate optical-path modifications the wavelength restriction may be accomplished after the beams pass through the cells, in conjunction with detection as at 308a. Beams 306a and 307a (and consequently 306 and 307) may be present in alternation, or may be otherwise systematically separated in time, phase or frequency, by means well-known in the art, so as to permit synchronous decoding of composite signal 306/7; or two different detectors 308a may be employed, presenting two separate electrical signals for further processing. In many types of problems it is desirable to use alternating optical beams, since the amplitude of the resulting ac electrical signal 306/7 is proportional to the difference between the two optical signals. In any event the sensors 204 and 205 of FIG. 2 are here represented by measurement optical beams 306a, 306, 307a and 307, and optical detector 308a, as well as the radiation-passing end windows of cells 302 and 303.

In the embodiment shown, composite electrical signal 306/7 proceeds to amplifier 308, which subtracts the respective components of the electrical signal if necessary and/or otherwise processes the electrical signal to create output signal 309, the embodiment of signals 9 in FIG. 1 and 209 in FIG. 2, which may have a waveform such as 620 or 630 in FIG. 6, or the corresponding waveforms of FIG. 6a; or which may be relatively unprocessed if preferred. This output signal is directed to appropriate utilization means, such as a motor 311 which by a mechanical linkage 312 controls the transverse position of a recording pen 313 on continuously advanced chart paper 314.

While a long intermediate flow means 310 produces delays and waveforms such as those illustrated in FIG. 6, my personal preference is for a delay line which is a conduit along an essentially straight path, preferably of variable (and gradually tapering) transverse internal dimension, between measurement cells 302 and 303 — to obtain waveforms such as those of FIG. 6a.

Figure 4:
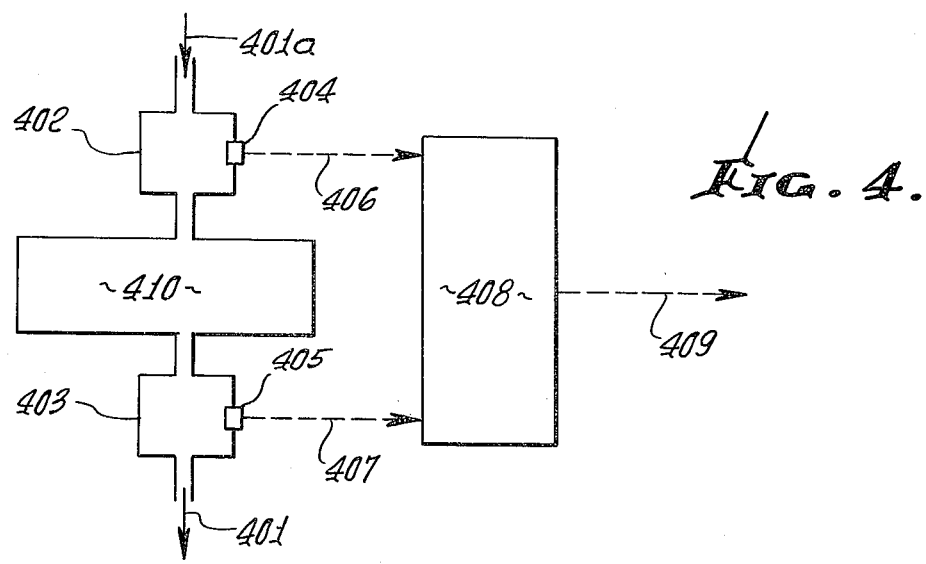
FIG. 4 is a schematic representation emphasizing the flow pattern of the series "dilution" form of my invention.

In FIG. 4, representing the "dilution" series form of my invention, fluid enters and leaves the measurement system at 401a and 401, respectively, traversing as before measurement stations 402 and 403 with their respective sensing means 404 and 405, which produce respective signals 406 and 407 for processing at 408 to produce an output signal directed at 409 to utilization means (not shown) such as previously described.

Here however the flow means 410 between stations 402 and 403 are represented schematically as being adapted for dilution of the various sample constituents in the fluid stream — that is, the volume of the flow means 410 is substantial relative to the volume of station 402, and furthermore the flow means have substantially the character of a chamber rather than a conduit or tubulation, in that their transverse dimension is, very generally, comparable to their length along the flow path. Thus this illustration shows in an emphasized and perhaps even exaggerated representation the "dilution" form of my invention.

It should be emphasized that throughout this disclosure and the appended claims the word "dilution" is used to mean the dilution of each sample constituent into the fluid which makes up the fluid stream preceding and following that constituent, so that the relatively slowlychanging contaminant concentration is preserved in the "dilution"; no additional quantity of carrier of other fluid is injected or otherwise added in "dilution" as the word is used herein.

As chamber 410 is very large compared with the volume of the fluid stream in which each sample constituent is initially (e.g., at 401a) contained, and the shape of chamber 410 is such as to disperse each sample constituent throughout chamber 410 in a continuous-dilution process, the peak concentration of each sample constituent at measurement station 403 is a very small fraction of the peak concentration previously present at station 402. The fraction is in fact so small that the concentration of each sample in station 403 may be neglected.

Figure 7:
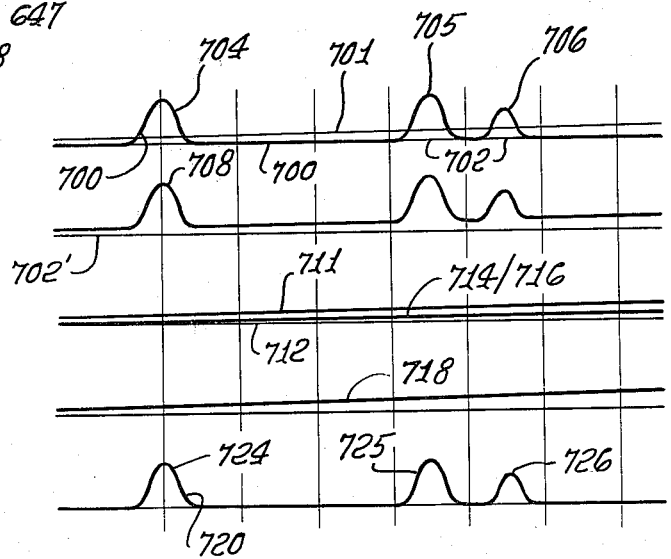
FIG. 7 is a signal diagram showing some time and signal-amplitude relationships involved in the "dilution" form of my invention — either series or parallel flow pattern.

FIG. 7 represents details of sample and contaminant concentrations in the two measurement stations 402 and 403 of FIG. 4, the resulting electrical signals at 406 and 407, and a corresponding possible version of output signal 409 — all vs. time. (FIG. 7 is also applicable to the "dilution" parallel-flow form of my invention.) In the top drawing of FIG. 7, the trace 700 represents actual concentrations of various sample constituents in measurement station 202, as such concentrations sequentially appear in that measurement station; trace 701 represents concentration of contaminant material during the sequential appearance of sample-constituent concentrations; and the line 702 represents the zero-concentration level. Thus peaks 704, 705 and 706 represent respectively the successive appearances of various sample constituents in the station. The contaminant concentration level 701 is significant relative to the sample concentrations; and changes significantly in a way which is not obviously correlated with the sample concentrations, but substantially less rapidly. The requirement for slowness in contaminant-concentration variations is at least an order of magnitude more stringent for the "dilution" form of my invention than for the "flow-delay" form. This is because in the "dilution" form accurate contaminant—concentration cancellations can be obtained only to the extent that the concentration in chamber 402 does not change too rapidly for the concentration in chamber 403 to "keep up;" but the latter concentration changes at the exceedingly slow rate imposed by the continuousdilution process in chamber 410.

In the second drawing of FIG. 7, the trace 708 (relative to zero line 702') represents the "sum" signal 406 (of FIG. 4) which results from response of sensor 404 to concentrations 700 and 701 simultaneously. (As before, the signals involved may be of opposite polarity to that shown, or subject to dc offset, or may require further signal processing to derive signals proportional to concentration; but for simplicity of discussion these matters are disregarded here.) Again, it is only this signal which is accessible in prior-art systems; and the object of my invention is to eliminate the variable and unknown contamination-generated component.

In the third drawing of FIG. 7, the traces 714/716, 711 and 712 represent the sample and contaminant concentrations and the zero level in the second measurement station 403, after passage of the sample fluid through dilution chamber 410. Because the volume of chamber 410 is orders of magnitude greater than the fluid volume in which any one sample constituent is in effect contained, the concentrations of constituents in chamber 410 (and proceeding from that chamber to measurement station 403) are correspondingly orders of magnitude lower than the concentrations in station 402; this is true at all times for all sample constituents other than contaminants.

The sample-concentration trace 714/716 is merely the long-time average value of trace 700; hence it is extremely close to zero line 712, provided only that the sample peaks in trace 700 are relatively infrequent (or small). The average value represented by trace 714/716 is "smeared out" over a long averaging period and is also delayed, relative to trace 700, by a long interval corresponding to the effective residence time of fluid in chamber 410 (i.e., the quotient of chamber volume and flow rate); however, inasmuch as the sample concentrations in station 403 are to be considered negligible, the delay applied to changes in these concentrations is of no consequence.

The contaminant concentrations of station 402 are similarly averaged and delayed to produce the concentration level 711 of station 403; however, since the contaminant entering at 401a tends to be representable as generally a smooth, nearly-horizontal trace 701 the averaging process does not greatly affect the concentration. To the extent that the contaminant concentration can be considered to change only negligibly during the effective residence time of fluid in dilution chamber 410, the traces 711 and 701 are substantially identical — so that subtraction of "sum" waveform 718 from "sum" waveform 708 yields "difference" waveform 720 wherein contaminant concentrations are accurately cancelled. If, as previously indicated, sample concentrations 714/716 in station 403 are negligible, then trace 720 represents purely the sample-constituent concentrations at station 402.

As previously noted, this representation is of excellent simplicity and straightforwardness — but fails in its accuracy if the contaminant concentrations change significantly within time intervals comparable to the residence time of fluid in dilution chamber 410. Particularly in the case of temperature-programmed gas-chromatograph columns this limitation is often significant, as coating "bleed" can change significantly in minutes; applicability of the dilution method to individual circumstances must therefore be determined with great care.

Figure 5:
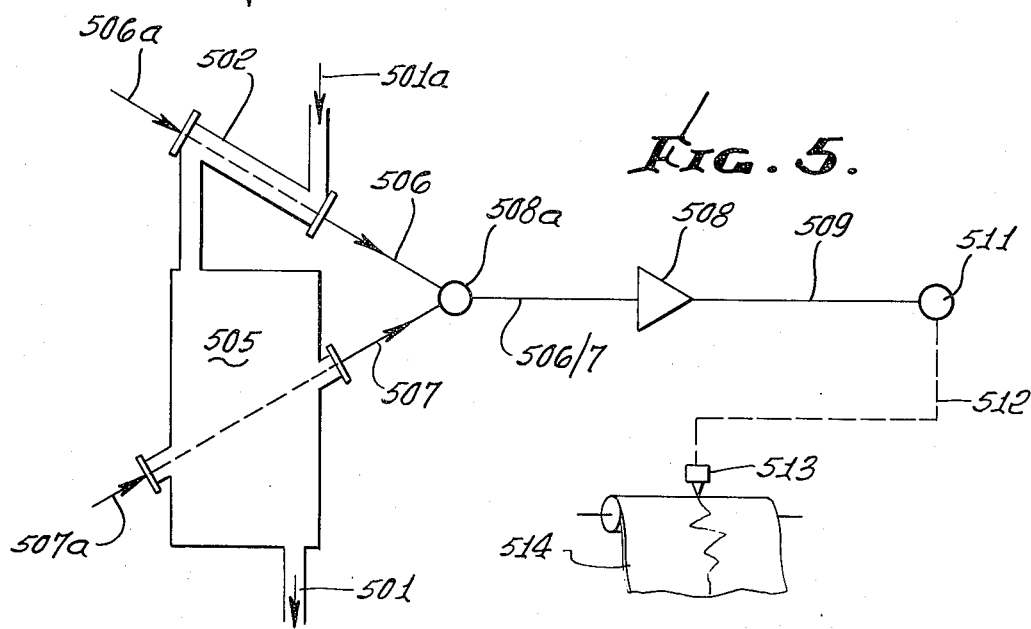
FIG. 5 is a more-detailed illustration exemplifying the general system of FIG. 4, using absorption spectrometry as a detection medium.

FIG. 5 represents in more specific terms the "dilution" series form of my invention. Here the measurement stations are flow-through optical cells 502 and 505, provided with opticalquality end windows for entrance of infrared (or other light) measurement beams 506a and 507a, and exit of such beams (after attenuation by any sample or contaminant present) at 506 and 507. The fluid stream for analysis enters cell 502 at 501a and leaves cell 505 at 501, passing between the cells through conduit 515.

In FIG. 5 it is assumed that 506a and 507a are beams of restricted wavelength and 508a is a detector producing an electrical signal in response to possibly attenuated beams 506 and 507 — also of restricted wavelength; however, wavelength restriction may be instead accomplished after the beams pass through the cells, in conjunction with detection. The beams are suitably separated in time, phase, and/or frequency, or two different detectors may be used.

In any event the sensors 404 and 405 of FIG. 4 are here represented by optical beams 506a, 507a, 506, 507, detector 508a, and the radiation-passing end windows of the cells 502 and 503.

Cell 503 serves a dual purpose. It performs the function of dilution chamber 410 in FIG. 4 and also that of measurement station 403 in FIG. 4. Both dilution and measurement take place at cell 503 — which is, as shown, formed as a transversely large chamber for fluid dilution but with end windows positioned substantially as are those of cell 502. If preferred for complete mixing in advance of measurement or for any other reason of accuracy or convenience, a dilution chamber may be formed separately from optical cell 503, as suggested in FIG. 4.

In the embodiment shown in FIG. 5, composite electrical signal 506/7 proceeds to amplifier 508, which subtracts the respective components of the electrical signal if necessary and/or otherwise processes the electrical signal to create output signal 509, the embodiment of signals 9 in FIG. 1 and 409 in FIG. 4, which may have a waveform such as 720 in FIG. 7; or which may be relatively unprocessed if preferred. This output signal is directed to appropriate utilization means, such as a motor 511 which by a mechanical linkage 512 controls the transverse position of a recording pen 513 on continuously advanced chart paper 514.

Figure 2A:
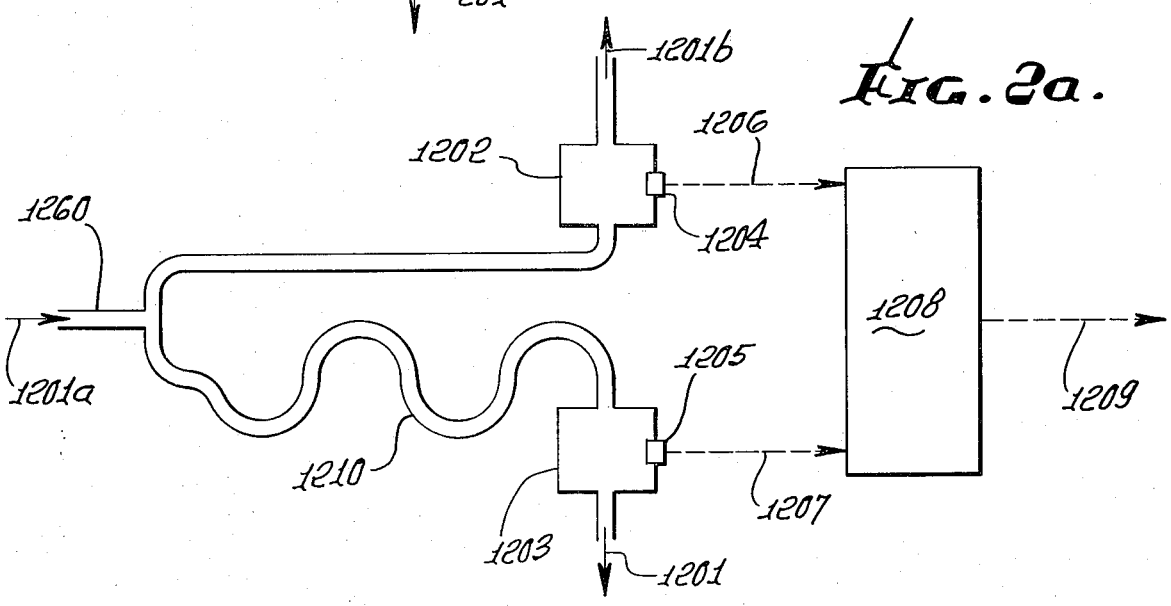
FIG. 2a is a modification of FIG. 2 illustrating the parallel "flow-delay" form of my invention.

Although I prefer to direct a single fluid stream through two measurement stations in series, some nearly equivalent arrangements can be produced in which the stream is split and directed through two measurement stations in parallel. Such systems are within the scope of my invention. For example, FIG. 2a shows a system very similar to that of FIG. 2, but here the stream entering at 1201a is split at tubulation junction 1260 into two streams which flow respectively to measurement station 1202 having sensing means 1204 for generation of signal 1206, this substream being vented at 1201b; and via delay line 1210 to measurement station 1203 having sensing means 1205 for generation of signal 1207, this substream being vented at 1201; and the processor 1208 effecting necessary computations to provide output signal 1209 in which the effects of contaminant in the fluid stream are substantially cancelled out.

This sort of arrangement — which is the parallel flow-delay form on my invention — is useful, but not optimal as it reduces the amount of both the contaminant and the sample constituents in both measurement stations, thereby degrading the effective signal-to-noise ratio. Similar arrangements may readily be visualized for the parallel dilution form of my invention, and all are within the scope of the appended claims.

It is to be understood that all of the foregoing disclosure applies equally well to liquid and gaseous fluid streams. Where fluid chromatographic columns are used preliminarily to disperse sample constituents in time for analysis, my invention is useful to equivalent advantage in both gas and liquid chromatographs.

Figure 8:
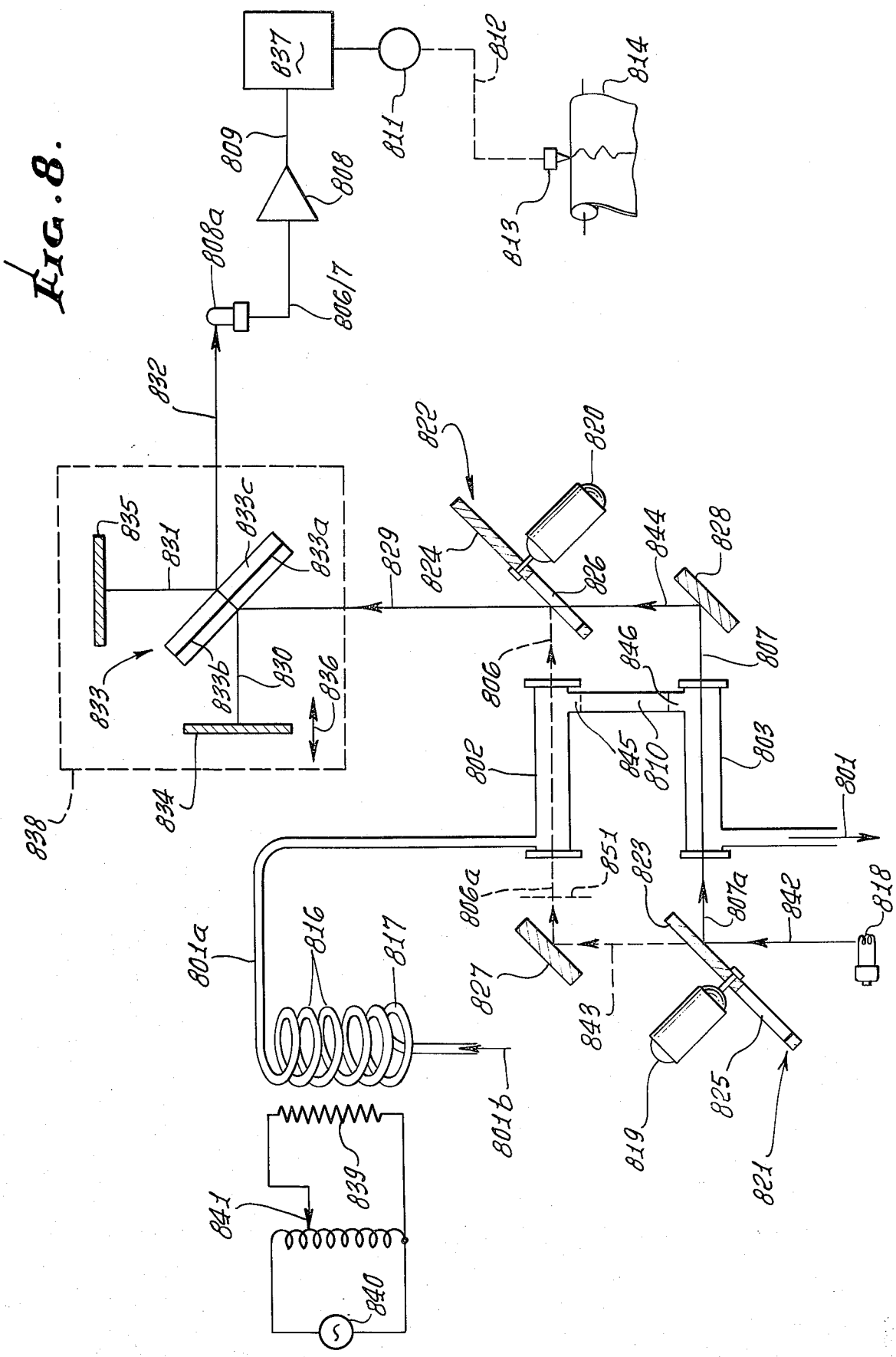
FIG. 8 is a schematic representation of a specialized embodiment of my invention in gas chromatographic analysis, with detection by interferometric infrared spectrometer. The series flow-delay form is involved.

FIG. 8 shows an application of the "flow-delay" form of my invention to the optical monitoring of gas-chromatograph effluent. This series flow-delay system is related to that of FIG. 3, but the system of FIG. 8 uses the critical-delay timing illustrated in FIG. 6a and discussed in connection therewith, and the measurement-beam wavelength separation is accomplished in conjunction with detection rather than "upstreams" (along the optical path) from points 306a and 307a.

In FIG. 8 a gas sample to be analyzed is typically injected as a narrow "slug" into a carrier gas stream which flows continuously into the system at 801b. The gas first enters chromatographic column 816, an elongated chamber which may have an extended film of "stationary phase" material — in which the sample constituents are differentially soluble — coated upon its inner surface 817. Alternatively, the elongated chamber 816 may contain appropriate "packing" material to provide an extended surface for adsorption, or for retaining an extended film of "stationary phase" material as a coating in which the sample constituents are differentially soluble, all as is well-known in the art. (For simplicity hereinafter and in the appended claims the term "coating" is used to refer to the coating upon the internal wall of the column, or upon the packing if such be in use; or the packing itself.)

As a result, in either case (direct coating or packing), various sample-gas constituents pass at correspondingly various rates through the column, therefore entering tube section 801a separately at correspondingly various times after injection of the sample at 801b. In this way the various sample constituents are separated in time for individual analysis.

Due to gas mixing (diffusion of each sample-constituent "slug" in both directions in the carrier-gas stream), the individual constituents do not enter tube 801a as perfect "slugs", their concentrations instead varying with a very-generally Gaussian-curve dependence on time — as previously illustrated (FIGS. 6, 6a and 7). Velocities of different gas constituents past the coating differ by orders of magnitude at room temperature; hence coating of the column to yield convenient passage times for "fast" gases at room temperature results in extremely long passage times for slower gases. For this reason an oven or heater is provided as symbolized at 839 — with electrical power application at 840 — to elevate the temperature and thereby increase the velocities of all the sample constituents through the packing. This device can be used after the "fastest" gases have all appeared at tube 801a, to hasten the arrival of the "slower" gases. In practice the temperature may be increased stepwise, or programmed for gradual, continuing increase, to effect passage of successive groups of progressively "slower" gases sequentially through the coating, by stepwise or continuous adjustment of oven or heater power as at the autotransformer 841.

The gas entering tube 801a comprises, in addition to the gas entering the chromatograph chamber or "column" at 801b, some gaseous material which is evolved from the coating. Such so-called "bleed" material is evolved more copiously at elevated temperatures; thus as the autotransformer 841 is manipulated to expedite passage of "slower" gases the "bleed" contamination concentration increases. It is a changing contaminant concentration such as this which gives rise to the need for my invention, and particularly the "flow-delay" form thereof.

In the preferred embodiment of my invention illustrated in FIG. 8, gas from the chromatographic column proceeds to a dual-cell analysis system, first entering optical cell 802. From this cell the gas flows through conduit 810 to cell 803, and thence is exhausted at 801. Conduit 810 is of transverse dimension chosen to provide critical delay and thereby yield waveforms as shown in FIG. 6a.

To effect measurement, infrared radiation from source 818 traverses one of cells 802 and 803 to conventional Michelson-type analyzing interferometer 838, the resultant radiation then proceeding to detector 808a.

Many specific sample-optical-path arrangements may be used to essentially equal advantage, but the system illustrated is usable. In this system synchronous motors 819 and 820 rotate respectively discs 821 and 822, which have respective front-reflective half-circle mirrors 823 and 824 and respective half-circle transmissive sectors (e.g., apertures) 825. These discs are so oriented and synchronized as to:

1 reflect the beam 842 from the glower or other source 818 at the surface 823 of the first disc 821 to a path 807a into cell 803, whence it exits at 807, is reflected at a flat mirror 828 along path 844, passes through the transmissive sector 826 of the second disc 822 and projects at 829 into the interferometer 838, all as indicated by the solid-arrow optical path in FIG. 8, or alternately to 2 pass the beam 842 from the glower or other source 818 through the transmissive sector 825 of the first disc 821 for projection along a path 843 to a flat mirror 827 which deflects the beam along a path 806a into cell 802, whence the beam proceeds at 806 to intercept the reflective-surface sector 824 of disc 822, all as indicated by the dashed-arrow optical path in FIG. 8, the reflected beam from the latter reflective surface then being projected, as before, along a path 829 into interferometer 838.

Within the interferometer 838, the entering beam 829 impinges upon a conventional beam divider 833, which is made up of two layers 833a and 833c of transmissive material of equal thickness, and an intermediate layer 833b of very high refractive index and only a few microns thick. Part of the beam traverses this divider and proceeds along a path 831 to a fixed mirror 835 for reflection and return to the divider, and part of the beam is reflected at the divider along a path 830 to movable mirror 834 for additional reflection and return to the divider. The movable mirror 830 is movable in a direction indicated by arrows 836 on the drawing. As is well-known, the beams returning along paths 830 and 831 from the mirrors to the divider are subject to mutual cancellation and reinforcement in ways which depend upon the wavelength of radiation and the position of the movable mirror 834 relative to the other elements of the interferometer.

The movable mirror 834 is moved along the indicated direction of motion 836 causing radiation of each wavelength to reinforce constructively and destructively in alternation, for projection as a modulated component of an exiting beam along the path 832 to the detector 808a. (Upon reaching one extreme position the mirror may then be similarly moved back to its other extreme position, generating a further modulation of radiation at each wavelength, or the mirror may be returned rapidly in preparation for another excursion.)

Thus in general a large fraction of the intensity of the beam 832 leaving the interferometer, produced by recombination of the two returning beams at the divider 833, is modulated in a complicated way when the movable mirror 834 is moved: radiation components of different wavelengths (and hence optical frequencies) are present in the exiting beam with correspondingly different intensity-modulation frequencies. Consequently different optical frequencies produce different electrical frequencies in the resulting signal 806/7. The various signal frequencies of interest can be subsequently either isolated by electrical filters or digitized and separated by calculation, using the conventional procedures of Fourier-transform spectroscopy. The intensity of the beam component at each such optical frequency (and the corresponding amplitude of the electrical signal component at each electrical frequency) is determined in part by the characteristics of the sample gas in the cell 802 or 803 through which the beam passes.

The electrical signal 806/7 from the detector is directed, after suitable amplification and preliminary processing in an amplifier 808, along a signal path 809 to a computer 837 — which may also receive information (along a path which is not illustrated) from a mechanism (not illustrated) which monitors the motion of the movable mirror 834. (For discussion of suitable mirror-position monitoring systems, refer for example to Robert J. Bell, *Introductory Fourier Transform Spectroscopy*, Academic Press, 1972.) The computer coordinates the detector signal with such other information in accordance with the well-known relationship between wavelength and electrical-signal frequency to derive an intensity-vs.-wavelength or absorption-vs.-wavelength spectrum. Electrical signals representing such information may be directed to operate a motor 811 to control via a mechanical linkage 812 the position of a recording pen 813 transversely upon a continuously advanced recording medium 814; and/or such representative electrical signals may be directed to other types of utilization means such as those previously enumerated.

It is to some extent a matter of choice whether (1) the movable mirror 834 be made to complete a full excursion of its motion during each half-rotation of the rotating discs 821 and 822, or (2) the rotating discs be made to complete a large multiplicity of rotations during each full excursion of the movable mirror 834. This rotation must in either case produce a frequency outside the band of modulation frequencies generated optically by the moving mirror — either below that band as in case "(1)" or above it for case "(2)". Some information is of necessity lost either way — primarily sacrificing continuity of the absorption information vs. time in case (1), and sacrificing measurement precision in case (2).

Since the rate at which sample constituents arrive at the optical cells 802 and 803 for analysis — i.e., the expansion of the system's time base — is in many instances of interest subject to control (by control of both carrier-gas flow rate and, in the case of chromatograph applications such as that illustrated, chromatographic column temperature), I prefer the case-(1) method of operation. By that method, using relatively low flow rates and temperatures, a continuous absorption-vs.-wavelength record (including cancellation of contaminant absorption by the principle previously described herein) may be obtained for each sample constituent.

It will be understood that, in this preferred method, while a complete excursion of the movable mirror 834 occurs during each half-cycle of the rotating discs 821 and 822, a large multiplicity of cycles of the rotating discs should occur during passage of each pertinent sample constituent through cells 802 and 803 — i.e., during the interval represented by, say, the distance 609a in FIG. 6a; whereby a reasonably continuous pointwise construction of the curve 623/623a in FIG. 6a can be effected by computer 837.

If integration of the detector output signal 806/7 is to be employed, as previously discussed, such integration is best performed numerically by computer 837, which also must perform the absorption-wavelength correlations required to produce a spectrum; apply corrections for wavelength dependence of source intensity, detector sensitivity, system-optics transmission, and interferometer efficiency; and perform in some instances many other computations such as those required to identify a constituent and to derive concentration data from the difference data received.

For adjustment of critical-delay timing to obtain waveforms such as 623/623a of FIG. 6a, the flow-delay conduit 810 may be made adjustable in transverse internal dimension; or for less stringent applications the portion of this conduit between points 845 and 846 may be made removable, for replacement by various replacement conduits 810 of various transverse internal dimensions.

An opaque shutter 851 may be provided to permit establishment of the zero-transmission signal level for one (e.g., 802) of the cells when desired.

Figure 9:
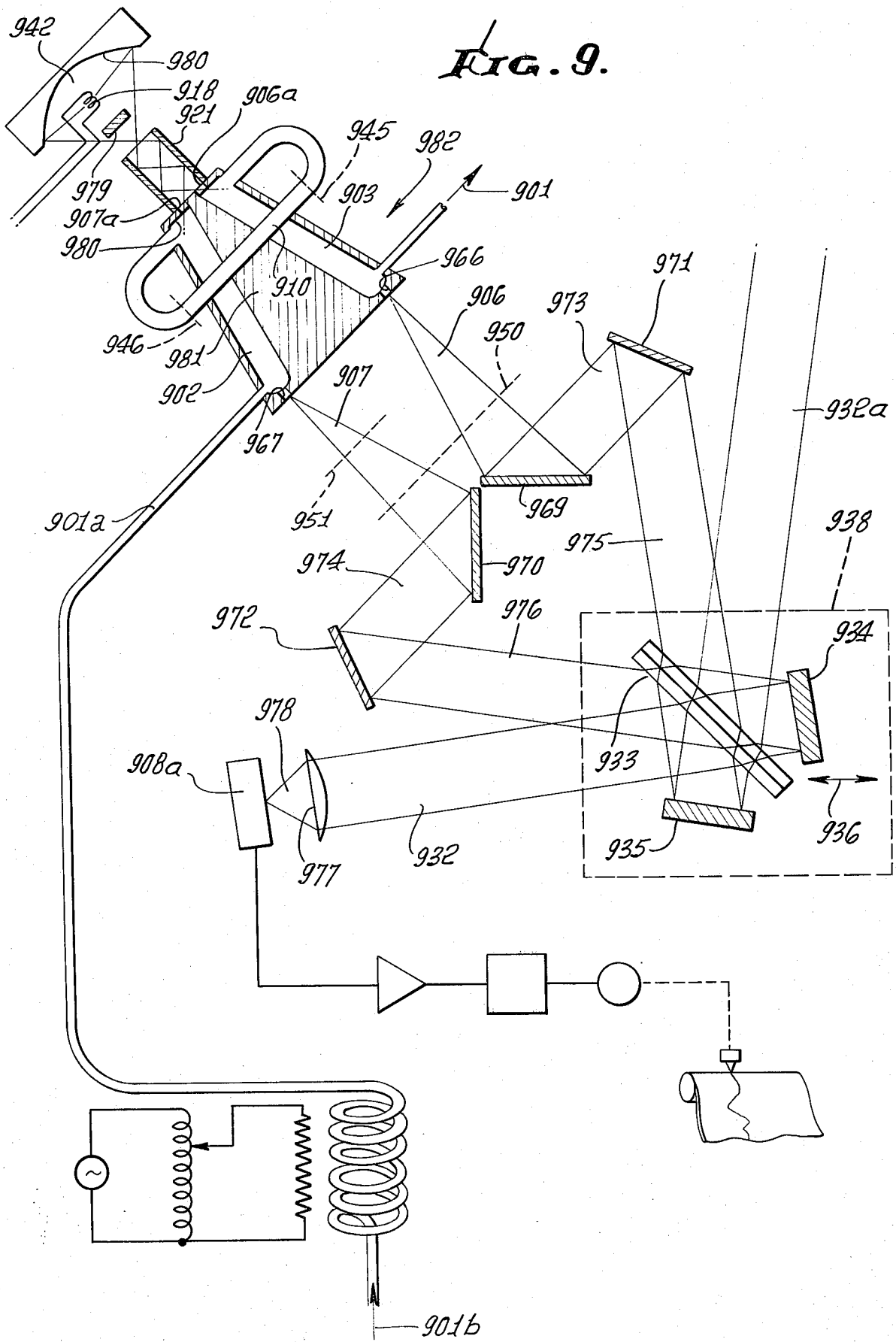
FIG. 9 is a schematic representation of a system similar to that in FIG. 8, but using a dual-input interferometer. The series flow-delay form is involved.

FIG. 9 illustrates a system which is similar to that of FIG. 8 but wherein some time limitations previously described are alleviated, and simultaneously some mechanical and electronic simplicity is realized, through the use of a dual-input interferometer. Interferometers operating on the same principle through quite dissimilar in configuration are understood to be in common use in astronomy for spectral comparison of "adjacent" portions of the sky (as described for example in *Science Journal*, April 1967, pp. 4–7).

In FIG. 9 the unnumbered elements function generally as do their counterparts of FIG. 8; the following discussion in limited to consideration of the ways in which the FIG. 9 system is different from the FIG. 8 system. In particular the chromatograph and heater arrangements are substantially identical and will not be discussed.

In this system, however, measurement radiation 942 is collected over a large solid angle by a stationary mirror 980 which focuses an image of the source 918 upon one end of a beam-scrambling device 921, direct passage of radiation from source 918 to scrambler 921 being prevented by a reflective mask 979; this mask 979 also prevents direct passage of radiation from the collecting mirror 980 to the remote end of scrambler 921.

The scrambler 921 is for example a right-circular or right-oval cyclinder whose internal walls are highly reflective, and whose ratio of length to typical diameter is generally between 2 and 6. Such a device in the illustrated optical arrangement transmits radiation along its length by multiple internal reflection, presenting at its remote end a radiation distribution pattern across its aperture which is effectively uncorrelated with the pattern presented by focusing mirror 980 to its entrance end; thus the radiation distribution at the remote end is less sensitive to relative intensity variations in the image of the source.

The remote end of the scrambler is juxtaposed to a pair of small entrance windows in the dual-cell structure 982. The latter comprises two substantially identical cells 902 and 903 separated by common wall 981, and a total of four reflective end walls 980 curved to effect multiple reflection of radiation entering at transmissive end-wall portions 906a and 907a, which serve as the aforesaid small entrance windows, admitting nominally equal samplings of the scrambled energy transmitted via the scrambler 921.

The sample gas, meanwhile, flows at 901a from the chromatograph column into one cell 902 of the two-cell structure, and thence from that cell via flow means 910 into the other cell 903; and finally is vented at 901. The individual sample constituents are thus presented in first one and then the other cell, to effect absorption of the radiation reflected multiply therethrough. Small transmissive section 966 in the remote curved reflective end wall of cell 902, and similar section 967 in the corresponding wall of cell 903, permit sampling of such multiply reflected radiation, after such absorption, as exiting beams 906 and 907 respectively. These beams are respectively deflected outward at curved mirrors 969 and 970 for passage at 973 and 974 to curved mirrors 971 and 972, which deflect the beams along paths 975 and 976 into the interferometer 938.

In a dual-input Michelson-type interferometer 938 such as that in FIG. 9, each of the two beams 975 and 976 incident upon the interferometer beam divider 933 behaves similarly to and produces effects similar to those produced by the single incident beam 829 of FIG. 8. The stationary mirror 935, mirror 934 movable in the direction indicated in the drawing by the arrows 936, and interferometer beam divider 933 function generally as do the corresponding elements 835, 834, 836 and 833 of FIG. 8 — acting upon each of the two input beams 975 and 976.

However, the resultant output beams also interact with each other, resulting in generation of an output beam 932 which comprises a component proportional to the difference between the intensities of the two input beams 975 and 976 — and a second output beam 932a in which the optical signals are of opposite phase and substantially equal amplitude. By means of apparatus (not shown) which monitors the position of the movable mirror 934, the phase and thus the effective polarity of the difference component, as well as its magnitude, can be determined for each electrical frequency of interest.

Through use of a conventional (e.g., dual-comb) beam-balancing device 950, small differences in the two optical paths in the absence of absorbing gases in cells 902 or 903 may be cancelled out — or this may be done by means of a calibration run stored in the computer. Similarly an opaque shutter 951 may be provided to permit establishment of the zero-transmission signal level for one (e.g., 902) of the cells when desired.

In actuality output beams 932 and 932a, when viewed as in FIG. 9 in orthographic projection along a viewing direction perpendicular to the plane of the paper on which FIG. 9 appears, would in some embodiments of my invention appear to be coincident with input beams 976 and 975, respectively. The output beams 932 and 932a would, even so, be physically separable from the input beams 976 and 975, respectively, through the use of approach paths for the input beams 976 and 975 which are representable as being at slight angles out of the plane of the paper of FIG. 9; the output beams 932 and 932a could consequently also be representable as angled slightly out of the plane of the paper, and would be thus separable from the inputs.

Alternatively, in other embodiments of my invention, these angles and separations may lie in the plane of the drawing just as illustrated in FIG. 9.

For simplicity of FIG. 9 the input and output beams are shown as separated by small angles in the plane of the drawing.

Either output beam 932 or 932a may be monitored — or in principle both, with approlpriate phase relationships being applied in combining the two resulting electrical signals. I consider it adequate to monitor a single output beam 932, inasmuch as energy availability is not typically the limiting facet of measurement precision in this type of instrumentation, and adding a second detector with its condensing optics and electronics would inprove signal-to-noise ratio only by 40 percent, at best, and at considerable cost. The output beam 932 proceeds via condensing lens 977 for convergence at 978 upon a detector 908a whose output signal is amplified and processed in a computer for display and/or other utilization generally as before, except that the signal amplification and processing are simplified slightly by the absence of need to determine the difference between two signals, since the dual-input interferometer performs this step.

An added advantage of the dual-input-interferometer system resides in the absence of a zero-order peak at the zero-path-difference point of the movable mirror's excursion — or rather, stated more fully, in the mutual cancellation of the two zero-order peaks (in each output beam) resulting from the two input beams respectively. This cancellation significantly relieves the stringency of requirements on detector linearity, for measurements made at and near the zero-path-difference point.

The data-interpretation discussions previously presented with reference to FIGS. 1 through 7 do not fully cover all the potential benefits of my background-autocancellation invention, because the signals discussed are presented for simplicity of discussion, as two-dimensional signals: signal amplitude vs. time. Many devices which may be used as sensing means, including spectrometric devices such as those of FIGS. 3, 5, 8 and 9, are in general capable of deriving what may be regarded as three-dimensional output information — i.e., signal amplitude vs. time and wavelength.

When such three-dimensional information-deriving capabilities are put to use in fluid-stream analysis — aided, for example, by liquid-or gas-chromatographic sample-constituent separation — then such instruments become much more useful for qualitative as well as quantitative analysis. That is to say, such instrumentation can be used much more readily to determine what constituents are in a given sample of initially unknown makeup, as well as to determine the quantities of such constituents.

However, when instrumentation is used in such ways then the adverse effects of slowly changing contaminant concentrations can become much more significant than merely the degradation of measurement precision in correspondence with relative concentration. This is because contaminants can (and in practical cases often do) have complex spectral structure, and may have some spectral features which are "strong," relative to sample-constituent spectral features, to an extent which is out of proportion to their relative concentrations.

Such contaminant spectral structure is easily confused with, and masks or conceals, the spectral features of many possible sample constituents of interest — particularly, but not necessarily, if such possible constituents are present in relatively low concentrations.

My invention permits effective autocancellation of such complex and/or strong contaminant spectral structure, in just the same way, spectral point by spectral point, as described hereinabove with respect to "two-dimensional" contaminant-signal autocancellation, thereby rendering qualitative analysis of fluid samples by analytical means such as gas chromatography and infrared interferometric spectrometry much more effective.

Although considerable discussion of interferometric analysis appears herein, my invention is not limited to such techniques and is also useful in improving the performance of more-conventional spectrometric devices including mass spectrometers and ordinary dual-beam absorption spectrometers. In the latter case, output signals produced by the instruments' standard circuits may be subjected to additional data processing as in an attached computer to compute difference data for integration (if desired) and finally reconversion to absorption or concentration information.

Moreover, as noted earlier, my invention has broad applicability to analysis of many kinds of fluids including liquids, and by many kinds of concentration-monitoring devices other than optical-attenuation detection systems.

In interpretation of the appended claims in view of the foregoing disclosure it should be borne in mind that terms such as "signals" may under some circumstances include optical signals as well as electrical and other types of signals; and that "signal-processing means" may under some circumstances include all or part of optical systems — e.g., all or parts of such devices as interferometer 938 of FIG. 9 — which effect substraction or other comparison or processing of such optical signals.

I claim:

1. A system for monitoring a first constituent in a fluid stream, which stream may also include at least one other constituent whose concentration in the stream changes slowly relative to the changes in concentration of the first constituent, comprising:

first and second monitoring stations, each having respective sensing means for deriving a respective measurement signal in quantitative response to fluid constituents in the respective station, each measurement signal comprising:

a principal component, derived in quantitative response to presence of such first constituent in the respective station, and an additional component, derived in quantitative response to presence of such other constituent in the respective station, this additional component being superimposed upon the respective principal component;

flow means, connected to both the first and second monitoring stations, for directing fluid from the fluid stream into and through the first station, and thence along a flow path into and through the second station, the flow means comprising:

a dilution chamber which is along the flow path between the fluid-exit ports of the two monitoring stations, said chamber having a large volume with respect to the volume of the first monitoring station;

signal-processing means for receiving the two signals, each including its respective superimposed principal and additional signal components, and deriving in response thereto a third signal which is a mathematical function of the first two signals, the function being such as to effect substantially complete mutual cancellation of the said additional measurement signal components, whereby the third signal comprises substantially only the principle components, corresponding to presence of the first constituent in the stream; and utilization means responding to the third signal.

2. The system of claim 1, wherein:
the dilution chamber includes the second monitoring station.

3. The system of claim 1, wherein:
the function derived by the signal-processing means is substantially proportional to the difference between the first two signals.

4. The system of claim 3, wherein:
the monitoring stations are flow-through sample and reference cells in a double-beam spectrometer.

5. A system for monitoring a first constituent in a fluid stream, which stream may also include a second constituent whose concentration in the stream changes slowly relative to the changes in concentration of the first constituent, comprising:

a first monitoring station, having first sensing means for deriving a principal component of a first measurement signal in quantitative response to presence of such first constituent in the first station;

said first station also deriving an additional component of the first measurement signal in quantitative response to presence of such second constituent, and this additional signal component being superimposed upon the principal component of the first measurement signal and constituting a spurious signal component with respect to the quantitative monitoring of such first constituent;

a second monitoring station, having second sensing means for deriving a principal component of a second measurement signal in quantitative response to presence of such first constituent in the second station, and also deriving an additional component of the second measurement signal in quantitative response to presence of such second constituent, this additional signal component being superimposed upon the principal component of the second measurement signal;

flow means, connected to both the first and second monitoring stations, for directing fluid from the fluid stream through each station;

the monitoring stations being flow-through sample and reference cells in a dual-input Michelson-type interferometric infrared spectrometer;

the said first and second measurement signals, each including its respective superimposed principal and additional signal components, being optical signals entering the spectrometer at its two inputs, respectively;

signal-processing means, comprising the interferometer itself, for receiving the two optical signals and deriving in response thereto a third signal which is a mathematical function of the first two signals, the function being such as to effect substantially complete mutual cancellation of the said additional measurement signal components, whereby the said third signal is an output signal of the interferometer, and comprises substantially only the principal components, corresponding to presence of the first constituent in the stream; and utilization means responding to the third signal.

6. A dual-input Michelson-type interferometric infrared spectrometer for monitoring the effluent from a gas chromatograph to effect constituent analysis of a sample gas, wherein infrared absorption by column coating material bled into the spectrometer sample cell is substantial relative to the infrared absorption by the sample gas constituents, the rates of change of the concentration of coating material in the sample cell being slow relative to the rates of change of sample- gas constituents in the sample cell, comprising:

a flow-through cell connected to receive the gas-chromatograph effluent and disposed so that one input beam of the spectrometer passes through the sample cell and effluent therein;

a flow-through reference cell connected to receive the effluent flow from the sample cell via an intermediate flow path and disposed so that the other input beam of the spectrometer passes through the reference cell and effluent therein;

whereby the quantity of coating material in the two input beams of the spectrometer is substantially equal, and the spectrometer is thereby substantially balanced with respect to the absorption of the coating material; and utilization means responsive to the spectrometer output signal.

7. The spectrometer of claim 6, wherein:
the intermediate flow path comprises delay means for establishing a time interval in transmission of the gas between the cells, which interval is substantial relative to the effective residence time of the stream in the sample cell.

8. The spectrometer of claim 6, wherein:
the intermediate flow path comprises a dilution chamber, whereby the concentrations of sample-gas constituents in the reference cell are negligibly low.

9. A dual-input Michelson-type interferometric infrared spectrometer for monitoring the effluent from a gas chromatograph to effect constituent analysis of a sample gas, wherein infrared absorption by a constituent of the chromatograph carrier gas is substantial relative to the infrared absorption by the sample gas constituents, the rates of change of the concentration of the said carrier-gas constituent in the sample cell being slow relative to the rates of change of sample-gas constituents in the sample cell, comprising:
- a flow-through sample cell connected to receive the gas-chromatograph effluent and disposed so that one input beam of the spectrometer passes through the sample cell and effluent therein;
- a flow-through reference cell connected to receive the effluent flow from the sample cell via an intermediate flow path and disposed so that the other input beam of the spectrometer passes through the reference cell and effluent therein;
- whereby the quantity of the said carrier-gas constituent in the two input beams of the spectrometer is substantially equal, and the spectrometer is thereby substantially balanced with respect to the absorption of the said carrier-gas constituent; and
- utilization means responsive to the spectrometer output signal.

10. A process for measuring the quantity of a particular constituent in a fluid sample having a multiplicity of constituents, comprising:
- causing the sample to flow through a medium which differentially disperses the constituents in time but which characteristically contains one or more contaminants, such contaminants being subject to gradual emission from the medium in use, whereby the medium adds one or more interfering contaminants to the sample;
- obtaining a continuous measure of the combined concentration of such particular constituent and contaminants, at each of two points along the sample flow path downstream of the dispersive medium;

and
- deriving the difference between the two measures.

11. A process for determining the constituent makeup of a fluid sample, comprising:
- causing the sample to flow through a medium which differentially disperses the constituents in time but which characteristically contains one or more contaminants, such contaminants being subject to gradual emission from the medium in use, whereby the medium adds one or more interfering contaminants to the sample;
- subjecting the dispersed sample to substantially continuous spectral analysis at two points along the sample flow path downstream of the dispersive medium;
- deriving a combination analysis by combining the spectral analyses from the two points, by a subtractive process so that the effects of the contaminant tend to cancel out while spectral analysis information for the fluid sample is retained in the combination analysis;

and
- comparing the combination analysis with known spectral-analysis characteristics of suspected constituents.

12. A system for analyzing gaseous samples, comprising:
- a gas-chromatograph column, connected to receive such gaseous samples in a stream, and having an active coating material which differentially delays passage through the column of various constituents of such gaseous samples in the stream,
- said coating material characteristically containing contamination which continuously bleeds from the coating material into the gaseous stream, producing contamination concentration in the stream which changes slowly relative to the changes in concentration of the differentially-delayed constituents;
- first and second monitoring stations, each having sensing means for deriving a principal component of a measurement signal in quantitative response to presence of the differentially delayed constituents in the corresponding station,
  - each of the two resulting measurement signal principal components having sequentially different amplitudes which correspond to the sequential presences of the differentially delayed constituents, respectively, in the corresponding station,
  - each of the two resulting measurement signals also having a spurious component derived in quantitative response to presence of the contamination in the corresponding station, this spurious component being superimposed upon the sequentially different amplitudes of the corresponding principal component;
- flow means, connected to the chromatograph column and to both the first and second monitoring stations, for directing the fluid stream from the chromatograph column through each station and for further delaying the arrival of the differentially delayed constituents at the second station;
- signal-processing means for receiving the two signals and deriving in response thereto a third signal which is a mathematical function of the first two signals,
  - the function being such as to effect substantially complete mutual cancellation of the two said spurious signal components arising from the contamination in the column coating material,
  - whereby the third signal comprises substantially only a component whose sequentially different amplitudes correspond to the sequential presences of the differentially delayed constituents in the stream, respectively; and
- utilization means responding to the third signal.

13. A system for analyzing gaseous samples, comprising:
- means for providing a stream of carrier gas along a flow path and for injecting a slug of such gaseous sample into such stream;
- a gas-chromatograph column, connected to the said flow path to receive such slug of gaseous sample in the stream of carrier gas, and having an active coating material which differentially delays passage through the column of various constituents of such gaseous sample in the stream,
- said carrier gas being characterized by contaminants, present even upstream of the point where the sample slug is injected, whose concentration in the effluent stream from the column changes only very slowly relative to the changes in concentration of the differentially-delayed constituents;
- a first monitoring station, having first sensing means for deriving a principal component of a first measurement signal in quantitative response to presence of the differentially delayed constituents in the first station, said first measurement signal's principal component having sequentially different amplitudes which correspond to the sequential presences of the differentially delayed constituents, respectively, said first measurement signal also having a spurious component derived in quantitative response to presence of the carrier-gas contaminants in the first station, this spurious component being superimposed upon the sequentially different amplitudes of the principal component of the first measurement signal;

a second monitoring station, having second sensing means for deriving a principal component of a second measurement signal in quantitative response to presence of the differentially delayed constituents in the second station, said second measurement signal's principal component having sequentially different amplitudes which correspond to the sequential presences of the differentially delayed constituents, respectively, said second measurement signal also having a spurious component derived in quantitative response to presence of the carrier-gas contaminants in the second station, this spurious component being superimposed upon the sequentially different amplitudes of the principal component of the second measurement signal;

flow means, connected to the chromatograph column and to both the first and second monitoring stations, for directing the fluid stream from the chromatograph column through each station and for further delaying the arrival of the differentially delayed constituents at the second station;

signal-processing means for receiving the two signals, each including its respective superimposed principal and spurious components, and deriving in response thereto a third signal which is a mathematical function of the first two signals, the function being such as to effect substantially complete mutual cancellation of the two said spurious signal components arising from the carrier-gas contaminants, whereby the third signal comprises substantially only a component whose sequentially different amplitudes correspond to the sequential presences of the differentially delayed constituents in the stream, respectively; and utilization means responding to the third signal.

14. A system for monitoring a first constituent in a fluid stream, which stream may also include at least one other constituent whose concentration in the stream changes slowly relative to the changes in concentration of the first constituent, comprising:

first and second monitoring stations, each having respective sensing means for deriving a respective measurement signal in quantitative response to fluid constituents in the respective station, each measurement signal comprising:

a principal component, derived in quantitative response to presence of such first constituent in the respective station, and an additional component, derived in quantitative response to presence of such other constituent in the respective station, this additional component being superimposed upon the respective principal component;

flow means, connected to both the first and second monitoring stations, for splitting the fluid stream at a branch point and directing part of the stream thence along a first flow path into and through the first station, and along a second, parallel flow path into and through the second station, the flow means comprising:

a dilution chamber which is along the second flow path between the branch point and the fluid-exit port of the second station, said chamber having a large volume with respect to the volume of the first station;

signal-processing means for receiving the two signals, each including its respective superimposed principal and additional signal components, and deriving in response thereto a third signal which is a mathematical function of the first two signals, the function being such as to effect substantially complete mutual cancellation of the said additional measurement signal components, whereby the third signal comprises substantially only the principal components, corresponding to presence of the first constituent in the stream; and utilization means responding to the third signal.

15. The system of claim 14, wherein the dilution chamber is also the second measuring station.

16. A system for monitoring a first constituent intermittently present in a fluid stream, which stream may also include a second constituent whose concentration in the stream changes slowly relative to the changes in concentration of the first constituent, comprising:

first and second monitoring stations, each having sensing means for deriving a principal component of a measurement signal in quantitative response to presence of such first constituent in the respective station;

said first and second station also each deriving an additional component of the respective measurement signal in quantitative response to presence of such second constituent, and this additional signal component being superimposed upon the principal component of the respective measurement signal and constituting a spurious signal component with respect to the quantitative monitoring of such first constituent;

flow means, connected to both the first and second monitoring stations, for directing fluid from the fluid stream through the two stations in parallel;

signal-processing means for receiving the two signals and deriving in response thereto a third signal which is a mathematical function of the first two signals, the function being such as to effect substantially complete mutual cancellation of the said additional measurement signal components, whereby the third signal comprises substantially only the principal components, corresponding to presence of the first constituent in the stream; and utilization means responding to the third signal.

17. A system for monitoring a first constituent in a fluid stream, which stream may also include a second constituent whose concentration in the stream changes slowly relative to the changes in concentration of the first constituent, comprising:

a first monitoring station, having first sensing means for deriving a principal component of a first measurement signal in quantitative response to presence of such first constituent in the first station;

said first station also deriving an additional component of the first measurement signal in quantitative response to presence of such second constituent, and this additional component being superimposed upon the principal component and constituting a spurious signal component with respect to such quantitative monitoring of such first constituent;

a second monitoring station, having second sensing means for deriving a principal component of a second measurement signal in quantitative response to presence of such first constituent in the second station, and also deriving an additional component of the second measurement signal in quantitative response to presence of such second constituent, this additional component being superimposed upon the principal component of the second measurement signal;

flow means, connected to both the first and second monitoring stations, for directing fluid from the fluid stream through each station, the flow means comprising a flow-delay path for establishing a time interval between arrival of corresponding portions of fluid from the fluid stream at the two stations, which interval is approximately equal to, or slightly greater than, the time interval corresponding to the width of a typical sample constituent's measurement-signal peak, halway up the peak as measured above the contaminant background;

signal-processing means for receiving the two signals, each including its respective principal and additional components, and deriving in response thereto a third signal whose magnitude is equal to the time integral of the difference between the first two signals; and utilization means responding to the third signal.

* * * * *

UNITED STATES PATENT AND TRADEMARK OFFICE
CERTIFICATE OF CORRECTION

PATENT NO. : 3,897,154
DATED : July 29, 1975
INVENTOR(S) : Roland C. Hawes

Sheet No. 1 of 2 sheets

It is certified that error appears in the above-identified patent and that said Letters Patent are hereby corrected as shown below:

In the drawings, Sheet 2, Fig. 5, the reference numeral "505" in the large chamber should be changed to read --503-- and a new reference numeral 515 should be applied to the tubulation between that chamber and the small chamber 502. In Sheet 3, Fig. 6, in the top drawing of that figure the reference numeral 600 is intended to refer to the entire signal comprising peaks 604, 605 et al., not only the zero-line portions thereof; therefore numeral 600 should be positioned and connected by leadlines to both the zero-line and one of the peaks (in the same way as numeral 608 appears in the second drawing of Fig. 6); reference numerals 620 and 630 in the fifth and sixth drawings of Fig. 6, respectively, should similarly be shown as applying to both the zero-line and peak portions of their respective traces. In the second drawing of Fig. 6 the reference numerals 624, 627 and 601 should be deleted; in the fifth drawing of Fig. 6 a new reference numeral 621a should be applied to the slightly ascending plateau portion of the trace between peaks 624a and 625; in the bottom drawing of Fig. 6 the vertical arrow labeled 647 should be moved 3/32 inch to the right so that it is just to the right of the vertical grid line and points to the nearly horizontal portion of the trace. In Fig. 8 the leadline from reference numeral 823 should point to the front of the rotating mirror, not the back -- i. e., to the lower right-hand surface of disc 821, not the upper surface. In Fig. 9 within the structure 982, and in particular within the cavity 902, the reference numeral "980" which is applied to the inside end-wall, just adjacent the transmissive portion 907a, should be changed to read --990a-- and a new reference numeral 990b similarly should be applied to the inside end-wall of cavity 903 adjacent the transmissive portion 906a; and a new reference numeral 990c should be applied to the lower inside end-wall of cavity 902 adjacent transmissive portion 967; and a new reference numeral 990d should be applied to the lower inside end-wall of cavity 903 adjacent transmissive portion 966. In column 7 of the text, at line 11 insert --elevated-- after "horizontal"; and cancel the paragraph running from lines 31 through 35 inclusive, which reads "If the heights . . . and pressure."; and in line

UNITED STATES PATENT AND TRADEMARK OFFICE
CERTIFICATE OF CORRECTION

PATENT NO. : 3,897,154
DATED : July 29, 1975
INVENTOR(S) : Roland C. Hawes

Sheet No. 2 of 2 sheets

It is certified that error appears in the above-identified patent and that said Letters Patent are hereby corrected as shown below:

27 after "peak" insert --606, and a distinct, nearly flat inflection point 647, representing the sample concentration corresponding to peak-- ; and in line 52 delete "603, 613, 608, 618,".
Column 8 at line 22 change "restriction" to --identification--. In column 9 at line 18 there should be a space between "slowly" and "changing"; at line 41 change "202," to --402,-- ; at line 57 change the dash between "contaminant" and "concentration" to a hyphen; and at line 62 there should be a space between "continuous" and "dilution". In column 10 in the penultimate line there should be a space between "optical" and "quality". In column 11 at line 4, change "505" to --503--. In column 13 at line 27 after "825" and before the period insert --and 826--. In column 15 at line 19 after "837" and before the period insert --for each wavelength of interest--. In column 16, at line 11 change "in" to --across--; and at line 17 change "980" to --990a, 990b, 990c and 990d,-- ; and at line 31 change "of cell 902," to read --990d of cell 903,-- ; and at line 32 change "of cell 903," to read --990c of cell 902,--. In column 17 at line 25 correct the spelling of --appropriate--. In column 19 at line 27 change "principle" to --principal--. Column 13, line 57, "830" should read -- 834 --.

Signed and Sealed this

Fifteenth Day of March 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,897,154          Dated July 29, 1975

Inventor(s) Roland C. Hawes

It is certified that error appears in the above-identified patent and that said Letters Patent are hereby corrected as shown below:

Column 8, line 17, after "restricted" insert -- or frequency-correlated --.

Column 10, in the penultimate line, "505" should read -- 503 --.

Column 26, line 10, "halway" should read -- halfway --.

Signed and Sealed this

Seventeenth Day of May 1977

[SEAL]

Attest:

RUTH C. MASON
*Attesting Officer*

C. MARSHALL DANN
*Commissioner of Patents and Trademarks*